United States Patent
Gross et al.

(10) Patent No.: US 8,041,963 B2
(45) Date of Patent: Oct. 18, 2011

(54) TECHNIQUE FOR REGULATING POWER-SUPPLY EFFICIENCY IN A COMPUTER SYSTEM

(75) Inventors: Kenny C. Gross, San Diego, CA (US); Anton A. Bougaev, La Jolla, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 574 days.

(21) Appl. No.: 12/186,389

(22) Filed: Aug. 5, 2008

(65) Prior Publication Data

US 2010/0037078 A1 Feb. 11, 2010

(51) Int. Cl.
*G06F 1/26* (2006.01)
*G06F 1/32* (2006.01)

(52) U.S. Cl. ........ 713/300; 713/320; 713/323; 713/330; 713/340; 702/60; 702/182

(58) Field of Classification Search .................. 713/300, 713/320, 323, 330, 340; 702/60, 182
See application file for complete search history.

(56) References Cited

U.S. PATENT DOCUMENTS

| | | | |
|---|---|---|---|
| 6,339,373 B1 * | 1/2002 | Zeskind et al. | 340/534 |
| 6,390,379 B1 * | 5/2002 | Huang | 236/49.3 |
| 6,947,775 B2 * | 9/2005 | Okamoto et al. | 455/574 |
| 7,085,944 B1 * | 8/2006 | Hamilton | 713/320 |
| 2009/0119064 A1 * | 5/2009 | Brundridge | 702/182 |

* cited by examiner

*Primary Examiner* — Thomas Lee
*Assistant Examiner* — Michael J Brown
(74) *Attorney, Agent, or Firm* — Park, Vaughan, Sleming & Dowler LLP; Steven E. Stupp (57) ABSTRACT

Embodiments of a system for regulating an efficiency of a power supply in a computer system are described. During operation, the system measures an output load of the power supply using one or more telemetry monitors in the computer system. Then, the system determines if an efficiency of the power supply corresponding to the measured output load is within a predetermined range that includes an optimal efficiency of the power supply. If the efficiency is outside of the predetermined range, the system performs remedial action so that the power supply operates at an adjusted efficiency that falls within the predetermined range.

20 Claims, 6 Drawing Sheets

TECHNIQUE FOR REGULATING POWER-SUPPLY EFFICIENCY IN A COMPUTER SYSTEM

BACKGROUND

1. Field of the Invention

The present invention relates to devices and techniques for monitoring a computer system. More specifically, the present invention relates to techniques for regulating the power-supply efficiency of computer systems based on measured power-supply output loads.

2. Related Art

As the cost of electricity to power and cool servers in data centers begins to approach the acquisition cost of the servers, it is becoming increasingly important to operate these servers in a power-efficient manner. In order to maximize the power efficiency of servers, it is important to maximize the power efficiency of the server components, such as power supplies.

Typically, power supplies are configured to operate over a fairly wide range of output loads. However, the operating power-conversion efficiency of a given power supply is a nonlinear function of its output load. For example, while a power supply may have maximum power-conversion efficiency at 85% output load, the power-conversion efficiency for output loads above and below this point can drop by 10% or more. Therefore, even though a power supply may have a high power-conversion efficiency, when it is used in a server it may operate in an output-load regime where the power-conversion efficiency is sub-optimal. Consequently, specifying a power supply with high power-conversion efficiency may not guarantee that a server operates in a power-efficient manner, unless the power supply has a constant power-conversion efficiency over the entire range of output loads. Unfortunately, this is not the case for most power supplies.

Hence, there is a need for techniques to ensure that servers, and more generally computer systems, operate in a power-efficient manner without the above-described problems.

SUMMARY

One embodiment of the present invention provides a system for regulating the efficiency of a power supply in a computer system. During operation, the system measures an output load of the power supply using one or more telemetry monitors in the computer system. Then, the system determines if an efficiency of the power supply corresponding to the measured output load is within a predetermined range that includes an optimal efficiency of the power supply. If the efficiency is outside of the predetermined range, the system performs remedial action so that the power supply operates at an adjusted efficiency that falls within the predetermined range.

In some embodiments, the adjusted efficiency approximately equals the optimal efficiency of the power supply.

In some embodiments, the remedial action includes dynamically adjusting a load schedule of the computer system that includes one or more jobs to be executed by the computer system. Moreover, the remedial action may include dynamically adjusting power management of one or more components in the computer system, such as: one or more processors, one or more processor cores and/or one or more memory devices. For example, dynamically adjusting the power management may include dynamically adjusting a voltage and/or a clock frequency of the one or more processors.

In some embodiments, the remedial action includes dynamically adjusting a speed of one or more fans in the computer system.

In some embodiments, the determining and the associated remedial action are performed for multiple power supplies in the computer system, thereby ensuring that the computer system operates within a system-wide predetermined efficiency range. Note that the system-wide predetermined efficiency range includes an optimal efficiency of the computer system. Moreover, the system-wide predetermined efficiency range may include a system-wide efficiency value approximately equal to the optimal efficiency of the computer system.

In some embodiments, the one or more telemetry monitors perform continuous telemetry monitoring. Moreover, the one or more telemetry monitors may monitor: processor load, memory utilization, interface activity, temperature, current, voltage, fan speed, and/or a vibration level.

In some embodiments, the efficiency of the power supply is determined using multivariate state-estimation (MSET) and/or a nonlinear, nonparametric regression technique. Moreover, MSET and/or the nonlinear, nonparametric regression technique may prevent an error associated with a given telemetry monitor in the one or more telemetry monitors from corrupting the determined efficiency. Note that the error may include failure of the given telemetry monitor and/or degradation of the given telemetry monitor.

Another embodiment provides a method which includes at least some of the aforementioned operations.

Another embodiment provides a computer-program product for use in conjunction with the system and/or the computer system, which includes instructions corresponding to at least some of the aforementioned operations.

Another embodiment provides the system and/or the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system, a computer system (which may the same or different than the system), a method, and a computer-program product (i.e., software) for use with the system and/or the computer system are described. These systems and processes may be used to regulate an efficiency of one or more power supplies in a computer system. In particular, output loads of the one or more power supplies may be measured, for example, using one or more telemetry monitors in the computer system. If the corresponding power-conversion efficiency of a given power supply is different than an optimal power-conversion efficiency (for example, if the power-conversion efficiency is outside of a range around the optimal power-conversion efficiency, such as within 10% of the optimal power-conversion efficiency), the system may perform remedial or corrective action. For example, the load schedule of one or more pending jobs in the computer system may be adjusted. Alternatively or additionally, power management in the computer system may be dynamically adjusted to: modify a voltage or a clock frequency of one or more components in the computer system; turn off or turn on the one or more components; and/or modify a speed of one or more cooling devices (such as a fan) in the computer system.

By performing the remedial action, the output loads of the one or more power supplies may be adjusted so that the power supplies, and thus the computer system, operate at near or at optimal efficiency (for example, so that the computer system operates with 10% of its optimal efficiency). This technique may reduce the power consumption, and thus the operating costs, of computer systems.

Note that computer system may include: servers, laptop computers, personal computers, work stations, mainframe computers, a data center, and/or a portable-computing device.

Moreover, note that the system, such as the computer system, may be at one location or may be distributed over multiple, geographically dispersed locations. Consequently, instructions and/or data associated with measurements that are executed by the system and/or the computer system may be received and communicated within the system over a network, such as: the Internet or World Wide Web (WWW), an intranet, a local area network (LAN) (such as IEEE 802.11 or WiFi), a wide area network (WAN) (such as IEEE 802.16 or WIMAX), a metropolitan area network (MAN), a satellite network, a wireless network (such as a cellular telephone network), an optical network, and/or a combination of networks or other technology enabling communication between computing systems or electronic devices.

In the discussion that follows, multivariate state estimation (MSET) refers to a class of regression techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different regression techniques. Hence, the term MSET as used in this specification can refer to (among other things) any technique outlined in [Gribok], including: ordinary least squares (OLS), support vector machines (SVM), artificial neural networks (ANNs), MSET, regularized MSET (RMSET), and/or a nonlinear, nonparametric regression technique.

Figure 1:
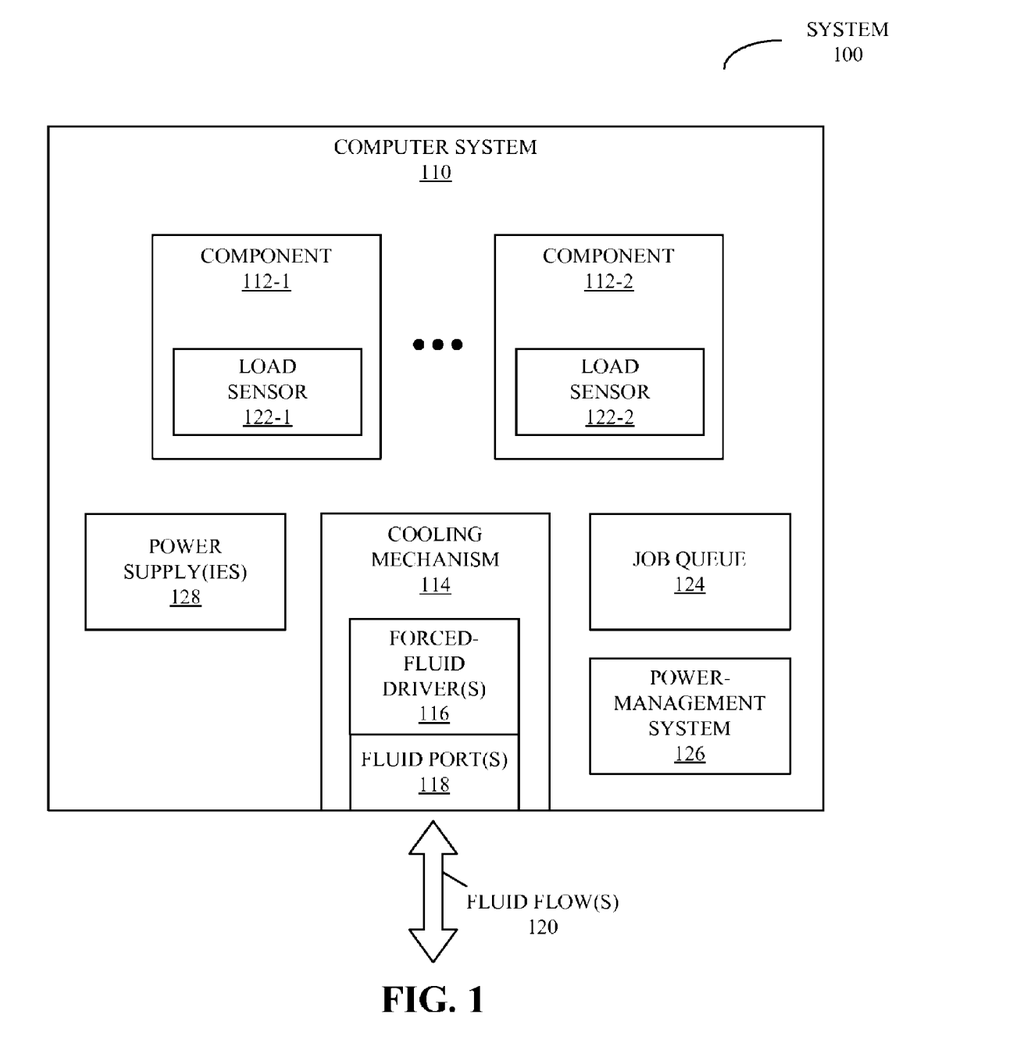
FIG. 1 is a block diagram illustrating a system in accordance with an embodiment of the present invention.

We now describe embodiments of a system. FIG. 1 presents a block diagram illustrating a system 100 that controls the power-conversion efficiency of one or more power supplies 128 in or associated with computer system 110. Computer system 110 includes one or more components 112, such as one or more integrated circuits, one or more memory modules and/or one or more processors or processor cores, which constitute an output load(s) for the one or more power supplies 128 that may vary based on the jobs that are executed in the one or more components 112. These components 112 are thermally coupled to a cooling mechanism 114, which includes one or more forced-fluid drivers 116 and one or more fluid ports 118.

Cooling mechanism 114 may pump heat from an enclosed area in computer system 110 to an external environment. For example, forced-fluid drivers 116 may produce fluid flows 120 that flow out from and/or flow in to the enclosed area through the one or more fluid ports 118. In an exemplary embodiment, the forced-fluid drivers 116 each include at least one fan, the fluid flows 120 include a gas (such as air) and the fluid ports 118 include air vents (such as an air inlet and/or an air outlet). However, in other embodiments alternate fluid drivers are used. For example, the forced-fluid drivers 116 may include one or more pumps and the fluid flows 120 may include a liquid, such as water.

Moreover, there may be one or more telemetry monitors in computer system 110. For example, there may be one or more load sensors 122 and/or one or more temperature sensors (not shown), such as thermocouples or ring oscillators, on components 112. As described further below with reference to FIG. 2, these telemetry monitors may perform continuous telemetry monitoring of one or more physical variables (such as output load) and/or additional parameters (such as temperature and/or performance metrics) in at least a portion of computer system 110. For example, the telemetry monitoring may include: processor load, memory utilization, input/output (I/O) activity, temperature, current, and voltage, cooling fan speed, and/or vibration level(s). In some embodiments, the telemetry monitoring, such as the load measurements, may include measurements in a set of time intervals.

These load measurements in one or more time intervals may be used to determine and/or to predict the power-conversion efficiency of the one or more power supplies 128. For example, the power-conversion efficiency may be estimated based on an operational history of at least the portion of the computer system 110, which includes executed jobs and associated load measurements, as well as pending jobs in a job queue 124. As described further below with reference to FIG. 2, in some embodiments the power-conversion efficiency may be determined by developing a regression model based on the load measurements, an efficiency-load characteristic of the one or more power supplies 128, the executed jobs, the pending jobs, and/or the additional telemetry signals. This analysis may be performed in the computer system 110 and/ or in an external device.

Based on the determined and/or predicted power-conversion efficiencies, a power-management system 126 may perform remedial action to regulate or control the power-conversion efficiencies of the one or more power supplies 128, and thus, the efficiency of computer system 110. For example, power-management system 126 may adjust a load schedule of the pending jobs in job queue 124 to change the output load of the one or more power supplies 128 so that the power-conversion efficiency is maintained at or near an optimal (i.e., a maximum) value. Moreover, power-management system 126 may modify a voltage and/or a clock frequency of the one or more components 112, such as one or more processors or processor cores. In some embodiments, power-management system 126 turns at least some of the components 112 on or off. In this way, power-management system 126 may modify the output load(s) of the one or more power supplies 128, thereby balancing customer workload variations in computer system 110 to approximately maintain the efficiency of computer system 110 during operation. This technique may allow the power-conversion efficiencies of each of the power supplies 128 to be independently and dynamically regulated over a wide range of operating modes of computer system 110.

Note that this regulation may occur without decreasing the performance of the computer system 110 (such as the throughput). Moreover, the regulation may be performed using closed-loop feedback control. For example, if a measured output load corresponds to a current or predicted power-conversion efficiency that is less than optimal, the output load may be increased or decreased so that the power-conversion is at or near the optimal value. For example, a multiple-input multiple-output (MIMO) control technique may adjust operational parameters (e.g., a fluid-forcing rate of one or more of forced-fluid drivers 116, such as an angular rotation rate or speed of one or more fans) and/or power-management features (e.g., dynamically adjusting voltages and/or frequencies of one or more of components 112). In some embodiments, the fluid-forcing rate of one or more of forced-fluid drivers 116 is adjusted by activating a specific fluid-driver technique in a set of available fluid-driver techniques.

Note that in some embodiments system 100 includes fewer or additional components. For example, components 112 can be included on a single integrated-circuit board or on multiple integrated-circuit boards. Moreover, two or more components may be combined into a single component and/or a position of one or more components may be changed.

Figure 2:
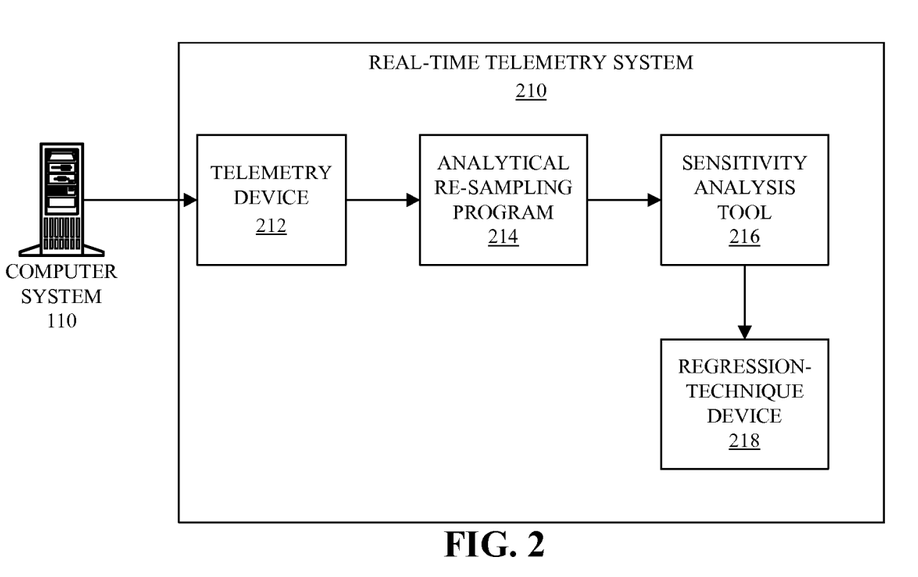
FIG. 2 is a block diagram illustrating a real-time telemetry system in accordance with an embodiment of the present invention.

We now discuss embodiments of a continuous-telemetry-monitoring system. FIG. 2 presents a block diagram of a real-time telemetry system 210 which monitors a computer system 110. This real-time telemetry system includes: telemetry device 212, analytical re-sampling program 214, sensitivity analysis tool 216, and/or regression-technique device 218 (which may use a regression technique, such as MSET and/or a nonlinear, nonparametric regression technique, to regulate a power-conversion efficiency of one or more power supplies).

Telemetry device 212 may gather information (such as load measurements, and more generally, telemetry signals) from various telemetry monitors or sensors (such as load sensors 122 in FIG. 1A) and/or monitoring tools within computer system 110 in real-time during operation of computer system 110. In some embodiments, measurements are performed: as needed, continuously, or when driven by an event (such as an interrupt). Note that the information gathered can include telemetry signals associated with internal performance parameters maintained by software within the computer system 110. For example, these internal performance parameters can include: system throughput, transaction latencies, queue lengths, load on one or more processors or processor cores, load on the memory, load on the cache, load on one or more power supplies, I/O traffic, bus saturation metrics, first-in first-out (FIFO) overflow statistics, and various operational profiles gathered through 'virtual sensors' located within the operating system.

Moreover, the information can include telemetry signals associated with canary performance parameters for synthetic user transactions, which are periodically generated for the purpose of measuring quality of service from the end user's perspective. Additionally, the information may include hardware or physical variables, including, but not limited to: distributed internal temperatures, environmental variables (such as relative humidity, cumulative or differential vibrations within the computer system 110, acceleration, fan speed, acoustic signals, current noise, voltage noise, and/or time-domain reflectometry readings), and/or energy consumption (such as currents and voltages).

Then, real-time telemetry system 210 directs the telemetry signals to local or remote locations that contain analytical re-sampling program 214, sensitivity analysis tool 216, and regression-technique device 218. In some embodiments, analytical re-sampling program 214, sensitivity analysis tool 216, and regression-technique device 218 are located within computer system 110. However, in other embodiments analytical re-sampling program 214, sensitivity analysis tool 216, and/or regression-technique device 218 are located on a plurality of computer systems, including computer system 110 and/or other remote computer systems.

Note that analytical re-sampling program 214 ensures that the telemetry signals have a uniform sampling rate. In doing so, analytical re-sampling program 214 may use interpolation techniques, if necessary, to fill in missing data points, or to equalize the sampling intervals when the raw data is non-uniformly sampled.

After the telemetry signals pass through analytical re-sampling program 214, they may be aligned and correlated by sensitivity analysis tool 216. For example, in some embodiments sensitivity analysis tool 216 uses a moving window technique that 'slides' through the telemetry signals with systematically varying window widths. These sliding windows systematically vary the alignment between windows for different telemetry signals to optimize the degree of association between the telemetry signals, as quantified by an 'F-statistic,' which is computed and ranked for all telemetry signal windows by sensitivity analysis tool 216.

When statistically comparing the quality of two fits, F-statistics reveal the measure of regression. In particular, the higher the value of the F-statistic, the better the correlation between two telemetry signals. In some embodiments, the lead/lag value for the sliding window that results in the F-statistic with the highest value is chosen, and the candidate telemetry signal is aligned to maximize this value. This process may be repeated for each telemetry signal by sensitivity analysis tool 216.

Note that telemetry signals that have an F-statistic very close to 1 are 'completely correlated' and can be discarded. This may occur when two telemetry signals are measuring the same metric, but express them in different engineering units. For example, a telemetry signal can convey a temperature in Fahrenheit, while another telemetry signal may convey the same temperature in Centigrade. Since these two telemetry signals are perfectly correlated, one does not contain any additional information over the other, and therefore, one may be discarded.

Moreover, some telemetry signals may exhibit little correlation, or no correlation whatsoever. In this case, these telemetry signals may be dropped as they add little predictive value. Once a highly correlated subset of the telemetry signals has been determined, they may be combined into one group or cluster for processing by the regression-technique device 218. In particular, regression-technique device 218 may determine one or more inferential models based on this subset of the telemetry signals, such as inferential models that associate load measurements with jobs that have executed and/or that will execute in at least the portion of computer system 110. These inferential models may be used to determine and/or to predict a power-conversion efficiency of one or more power supplies that are in or that are associated with computer system 110, thereby facilitating efficiency regulation and/or optimization for computer system 110.

In an exemplary embodiment, the inferential models are used in conjunction with a power-management system (such as power-management system 126 in FIG. 1) that includes a MIMO control technique. This control technique may ensure that the power supplies in or associated with computer system 110 operate in an optimal regime that maximizes the overall power efficiency of computer system 110. For example, this control technique may dynamically adjust operational parameters (such as cooling fan speeds) and/or power-management features in computer system 110.

Note that the one or more inferential models may be determined during a training (or testing) mode and/or in real time as the telemetry signals are collected. For example, load measurements may be performed while a sequence of operations (such as a load script that includes one or more jobs) is executed in computer system 110. Then, the load measurements, as well as other telemetry signals, are received. Next, an inferential model may be determined by performing analysis on the received signals (in either the time domain and/or the frequency domain) and associated efficiency-load characteristic(s) for the one or more power supplies using a regression technique.

In some embodiments, the one or more inferential models allow drifting or degrading telemetry monitors or sensors (such as those affected by linear decalibration bias) to be identified. Then, such telemetry sensors can be masked in the feedback control of the power-conversion efficiency of the one or more power supplies (until the affected sensors are replaced). In some embodiments, additional telemetry signals are used to regulate the power-conversion efficiency of the one or more power supplies. This may allow the efficiency-regulation technique to be used in systems that do not include multiple, redundant telemetry monitors or sensors.

In some embodiments, real-time telemetry system 210 includes fewer or additional components. Moreover, two or more components may be combined into a single component and/or a position of one or more components may be changed. In some embodiments the functionality of real-time telemetry system 210 is implemented more in hardware and less in software, or less in hardware and more in software, as is known in the art.

Figure 3:
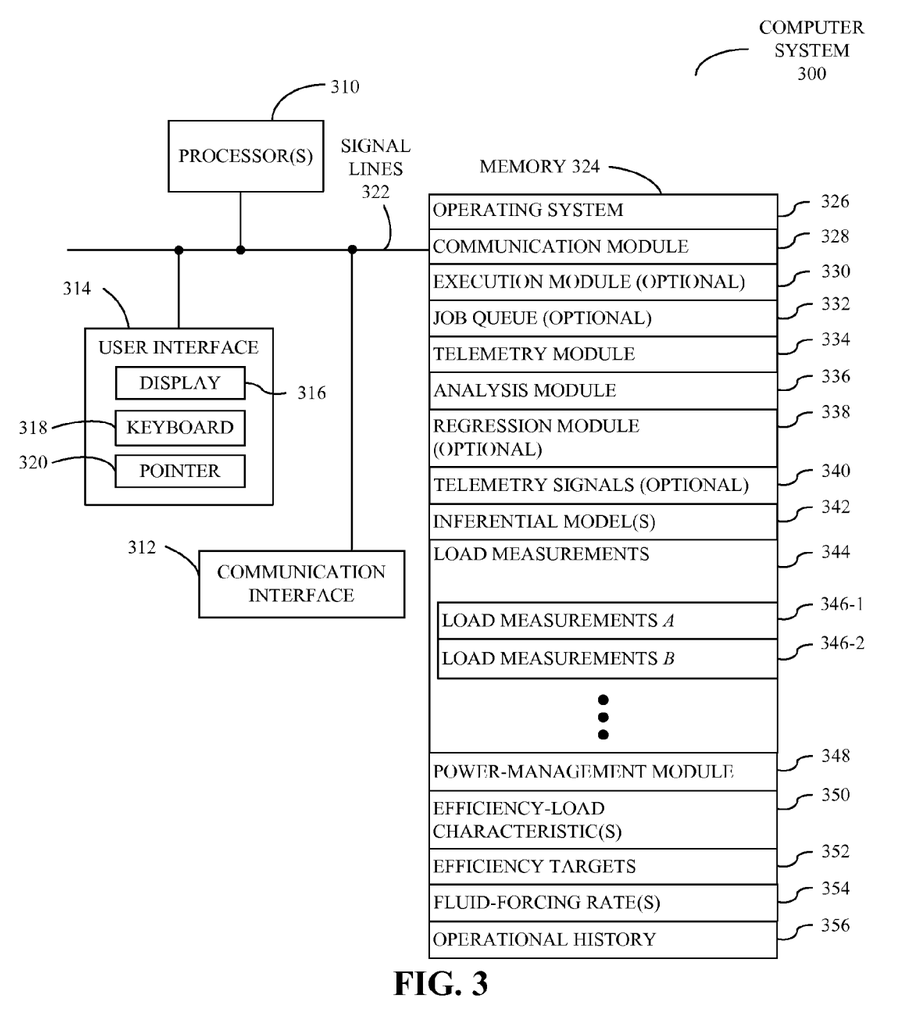
FIG. 3 is a block diagram illustrating a computer system in accordance with an embodiment of the present invention.

FIG. 3 presents a block diagram illustrating a computer system 300, such as the computer system 110 (FIGS. 1 and 2). Computer system 300 includes: one or more processors (or processor cores) 310, a communication interface 312, a user interface 314, and one or more signal lines 322 coupling these components together. Note that the one or more processors (or processor cores) 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Moreover, memory 324 may also store communication procedures (or a set of instructions) in a communication module 328. These communication procedures may be used for communicating with one or more computers, devices and/or servers, including computers, devices and/or servers that are remotely located with respect to the computer system 300.

Memory 324 may also include one or more program modules (or a set of instructions), including: optional execution module 330 (or a set of instructions), telemetry module 334 (or a set of instructions), analysis module 336 (or a set of instructions), optional regression module 338 (or a set of instructions), and/or power-management module 348. During operation of the computer system 300, telemetry module 334 may perform load measurements 344, such as load measurements A 346-1 or load measurements B 346-2, associated with one or more telemetry sensors (such as one or more of load sensors 122 in FIG. 1).

In some embodiments, optional execution module 330 performs one or more processes, such as one or more of the jobs in optional job queue 332, either before and/or during the load measurements 344. In this way, load measurements associated with a previous operation of computer system 300 may be determined.

After the load measurements 344 are received, analysis module 336 may analyze the load measurements 344 using optional regression module 338 to determine one or more inferential models 342 that can be used to determine and/or predict an efficiency of at least a portion of computer system 300. For example, a given inferential model may be determined using a nonlinear, nonparametric regression technique based on: load measurements 344 (such as a time series of load measurements), efficiency-load characteristics 350 of the power supplies, efficiency targets 352, previously executed jobs in operational history 356, and/or pending jobs in optional job queue 332. For example, using an efficiency-load characteristic and a load measurement, the current power-conversion efficiency may be determined. This power-conversion efficiency may be compared to an efficiency target to determine if remedial action is required. In some embodiments, the inferential model may be based on the previously executed jobs. Moreover, the inferential model may also be used to predict a future power-conversion efficiency based on the pending jobs (which can be used to adjust a load schedule of jobs in optional job queue 332). Note that the one or more inferential models 342 may be determined during a training mode (e.g., previously) or during a monitoring mode (e.g., in real time).

In some embodiments, the given inferential model is also determined based on one or more optional telemetry signals 340. These optional telemetry signals 340 for one or more physical variables may be collected by telemetry module 334 using one or more physical sensors (which may be included on components in computer system 300, such as processors 310).

Then, if needed, remedial action may be performed by power-management module 348. For example, power-management module 348 may: turn-on one or more components, turn-off one or more components, adjust a voltage, adjust a clock frequency, and/or adjust or select a fluid-forcing rate 354 of a cooling device (such as a speed of a fan).

Instructions in the various modules in the memory 324 may be implemented in: a high-level procedural language, an object-oriented programming language, and/or in an assembly or machine language. The programming language may be compiled or interpreted, i.e., configurable or configured, to be executed by the one or more processors (or processor cores) 310.

Although the computer system 300 is illustrated as having a number of discrete components, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component and/or a position of one or more components may be changed. In some embodiments the functionality of computer system 300 may be implemented more in hardware and less in software, or less in hardware and more in software, as is known in the art.

Figure 4:
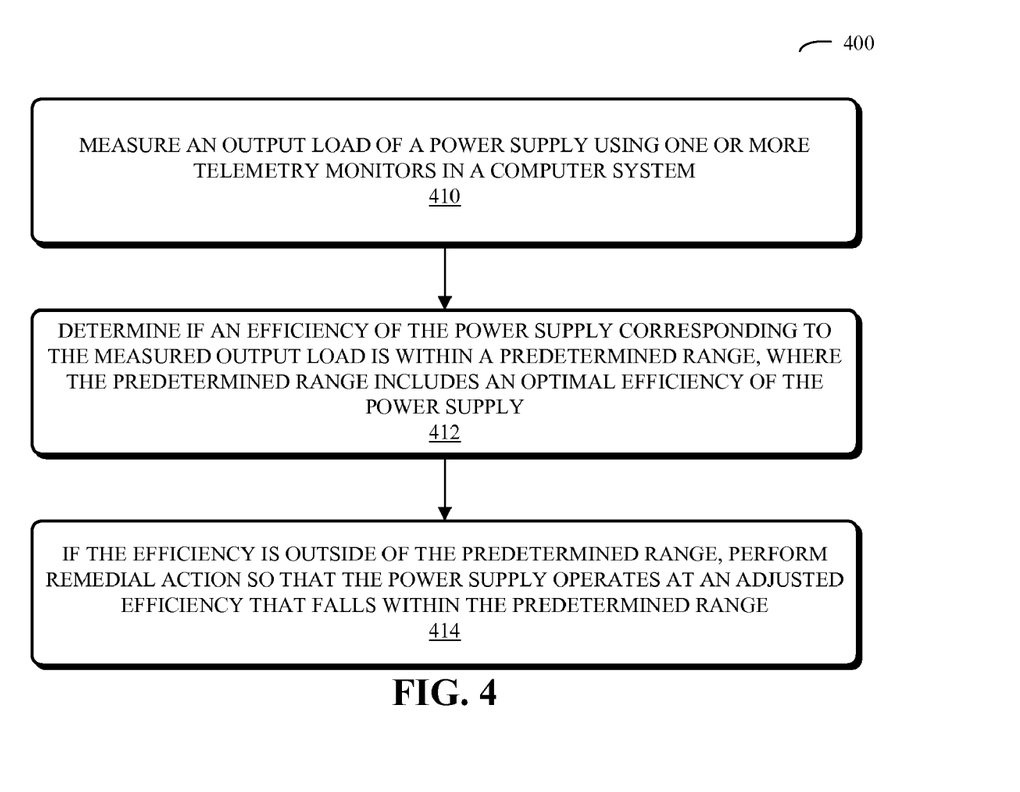
FIG. 4 is a flowchart illustrating a process for regulating an efficiency of a power supply in a computer system in accordance with an embodiment of the present invention.

We now discuss embodiments of methods for regulating an efficiency of a power supply in a computer system. FIG. 4 presents a flowchart illustrating a process 400 for regulating an efficiency of a power supply in a computer system, which may be performed by a system. During operation, the system measures an output load of the power supply using one or more telemetry monitors in the computer system (410). Then, the system determines if an efficiency of the power supply corresponding to the measured output load is within a predetermined range, where the predetermined range includes an optimal efficiency of the power supply (412). If the efficiency is outside of the predetermined range, the system performs remedial action so that the power supply operates at an adjusted efficiency that falls within the predetermined range (414).

Figure 5:
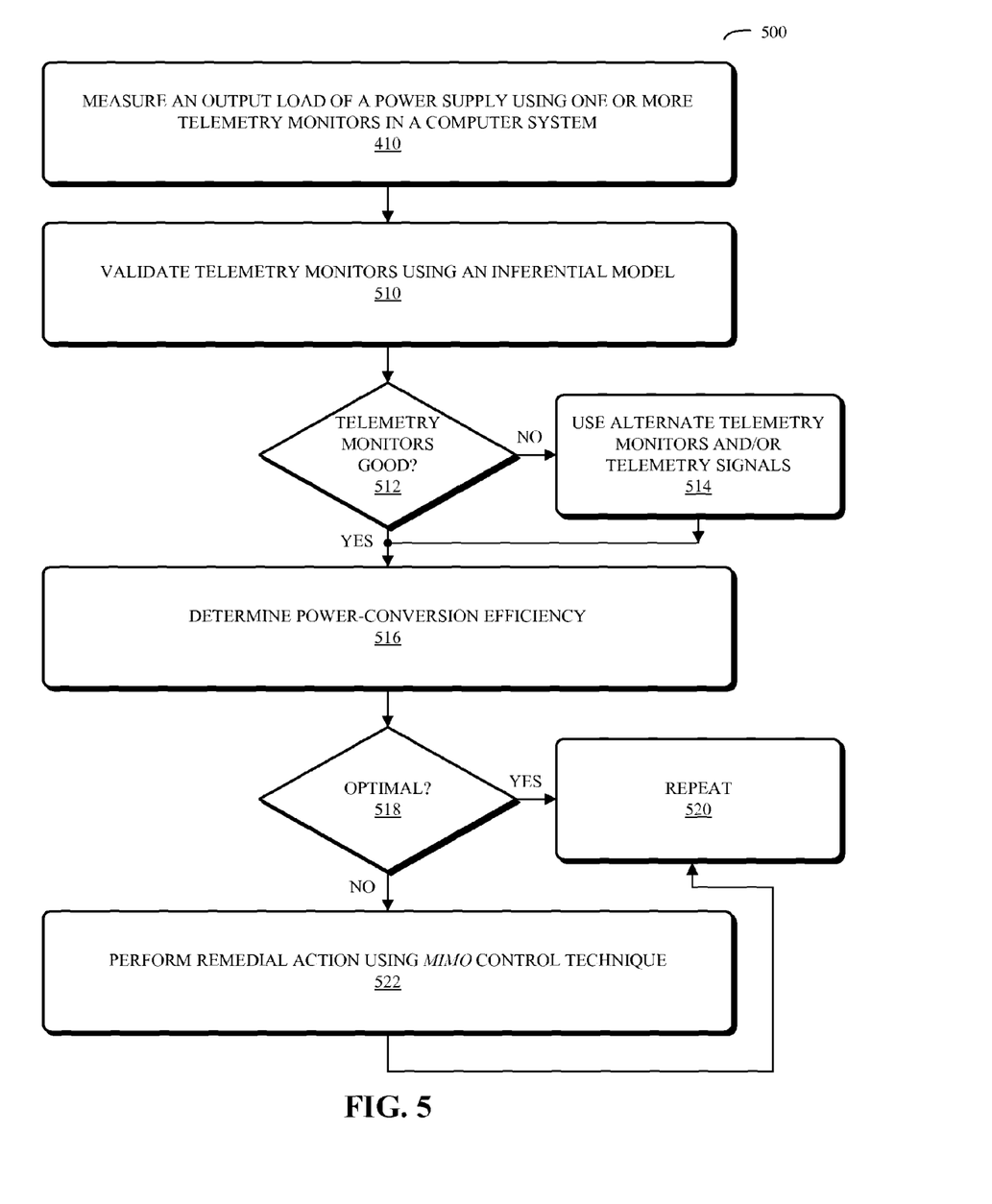
FIG. 5 is a flowchart illustrating a process for regulating an efficiency of a power supply in a computer system in accordance with an embodiment of the present invention.

FIG. 5 presents a flowchart illustrating a process 500 for regulating an efficiency of a power supply in a computer system, which may be performed by a system. During operation, the system measures the output load of the power supply using one or more telemetry monitors in the computer system (410). Then, the system validates the telemetry monitors using an inferential model (510). If the telemetry monitors are good (512), the system determines the corresponding power-conversion efficiency (516) using the measured output load. However, if the telemetry monitors are not good (512), the system may use alternate telemetry monitors and/or telemetry signals (514) when determining the power-conversion efficiency (516).

Next, the system compares the determined power-conversion efficiency to a target power-conversion efficiency. If the power-conversion efficiency is approximately optimal (518), process 500 repeats (520) starting at operation (410). However, if the power-conversion efficiency is not optimal (518), the system performs remedial action using a MIMO control technique (522). Then, process 500 repeats (520) starting at operation (410).

In some embodiments of processes 400 (FIG. 4) and 500 there may be additional or fewer operations. Moreover, the order of the operations may be changed and/or two or more operations may be combined into a single operation. Additionally, the preceding operations may be implemented using hardware and/or software, as is known in the art.

Figure 6:
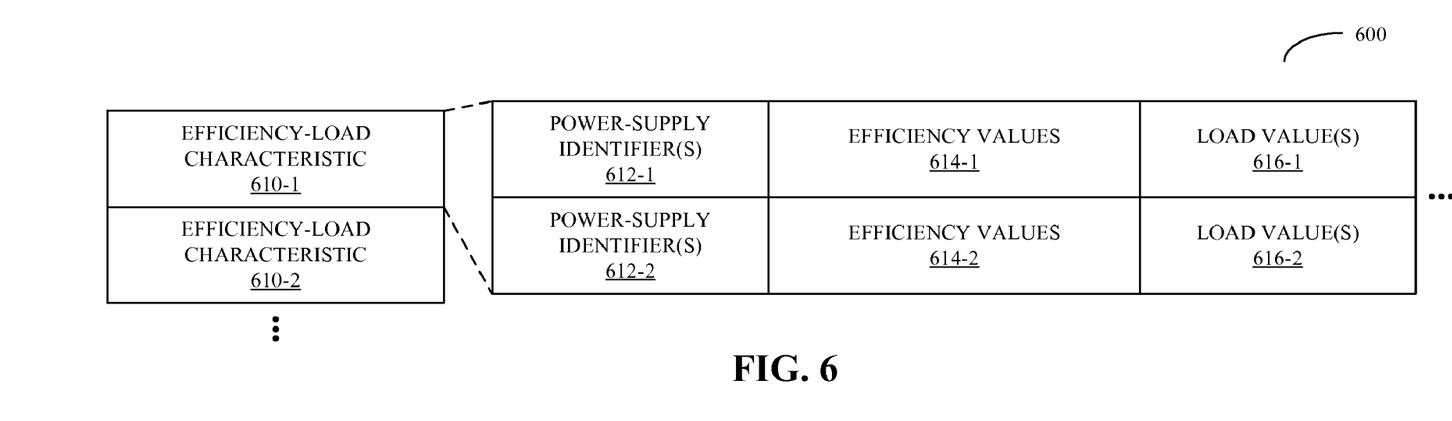
FIG. 6 is a block diagram illustrating an embodiment of a data structure in accordance with an embodiment of the present invention.

We now describe data structures for use in computer system 100 (FIG. 1) and 300 (FIG. 3). FIG. 6 presents a block diagram illustrating an embodiment of a data structure 600. This data structure may include efficiency-load characteristics 610 for one or more power supplies. A given instance of the efficiency-load characteristics 610, such as efficiency-load characteristic 610-1, may include: one or more power-supply identifiers 612, one or more power-conversion efficiency values 614, and/or one or more output load values 616.

Figure 7:
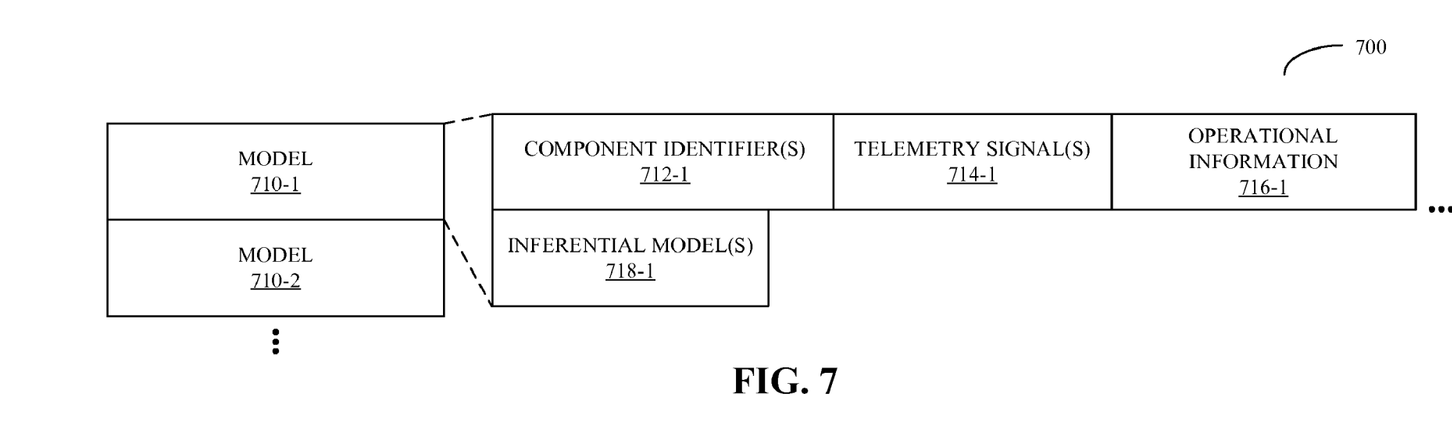
FIG. 7 is a block diagram illustrating an embodiment of a data structure in accordance with an embodiment of the present invention.

FIG. 7 presents a block diagram illustrating an embodiment 700 of a data structure. This data structure may include models 710. A given instance of the models 710, such as model 710-1, may include multiple entries for: one or more component identifiers 712 in a computer system (such as one or more integrated circuits), one or more telemetry signals 714 (which may include output load values for one or more power supplies associated with one or more components), operational information 716 (such as jobs executed by the one or more components), and/or one or more inferential models 718 (which may include coefficients in a regression expression that relates the one or more telemetry signals 714 and the operational information 716 to a predicted overall efficiency of the one or more components).

Note that that in some embodiments of the data structures 600 (FIG. 6) and 700 there may be fewer or additional components. Moreover, two or more components may be combined into a single component and/or a position of one or more components may be changed.

While the preceding embodiments describe optimizing the power-conversion efficiency of one or more power supplies in a computer system by dynamically adjusting one or more output loads and/or power-management techniques, in other embodiments these techniques may be used to optimize the power-conversion efficiency of power supplies in a wide variety of applications.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for regulating an efficiency of a power supply in a computer system, comprising:
    measuring an output load of the power supply using one or more telemetry monitors in the computer system;
    determining if an efficiency of the power supply corresponding to the measured output load is within a predetermined range, wherein determining if the efficiency is within the predetermined range comprises predicting the efficiency based on an operational history of at least a portion of the computer system and pending jobs in a job queue, wherein the predetermined range includes an optimal efficiency of the power supply; and
    if the efficiency is outside of the predetermined range, performing remedial action so that the power supply operates at an adjusted efficiency that falls within the predetermined range.

2. The method of claim 1, wherein the adjusted efficiency approximately equals the optimal efficiency of the power supply.

3. The method of claim 1, wherein the remedial action includes dynamically adjusting a load schedule of the computer system; and
    wherein the load schedule includes one or more jobs to be executed by the computer system.

4. The method of claim 1, wherein the remedial action includes dynamically adjusting power management of one or more components in the computer system.

5. The method of claim 4, wherein the one or more components include one or more processors.

6. The method of claim 5, wherein dynamically adjusting the power management includes dynamically adjusting a voltage or a clock frequency of the one or more processors.

7. The method of claim 4, wherein the one or more components include one or more processor cores.

8. The method of claim 4, wherein the one or more components include one or more memory devices.

9. The method of claim 1, wherein the remedial action includes dynamically adjusting a speed of one or more fans in the computer system.

10. The method of claim 1, wherein the determining and the associated remedial action are performed for multiple power supplies in the computer system, thereby ensuring that the computer system operates within a system-wide predetermined efficiency range; and
wherein the system-wide predetermined efficiency range includes an optimal efficiency of the computer system.

11. The method of claim 10, wherein the system-wide predetermined efficiency range includes a system-wide efficiency value approximately equal to the optimal efficiency of the computer system.

12. The method of claim 1, wherein the one or more telemetry monitors perform continuous telemetry monitoring.

13. The method of claim 1, wherein the one or more telemetry monitors monitor processor load, memory utilization, interface activity, temperature, current, voltage, fan speed, or a vibration level.

14. The method of claim 1, wherein the efficiency of the power supply is determined using multivariate state-estimation (MSET).

15. The method of claim 1, wherein the efficiency of the power supply is determined using a nonlinear, nonparametric regression technique.

16. The method of claim 15, wherein the nonlinear, nonparametric regression technique prevents an error associated with a given telemetry monitor in the one or more telemetry monitors from corrupting the determined efficiency.

17. The method of claim 16, wherein the error includes failure of the given telemetry monitor.

18. The method of claim 16, wherein the error includes degradation of the given telemetry monitor.

19. A computer-program product for use in conjunction with a computer system, the computer-program product comprising a non-transitory computer-readable storage medium and a computer-program mechanism embedded therein for configuring the computer system, the computer-program mechanism including:
instructions for measuring an output load of a power supply in a computer system using one or more telemetry monitors in the computer system;
instructions for determining if an efficiency of the power supply corresponding to the measured output load is within a predetermined range, wherein determining if the efficiency is within the predetermined range comprises predicting the efficiency based on an operational history of at least a portion of the computer system and pending jobs in a job queue, wherein the predetermined range includes an optimal efficiency of the power supply; and
instructions for performing remedial action if the efficiency is outside of the predetermined range so that the power supply operates at an adjusted efficiency that falls within the predetermined range.

20. A computer system, comprising:
a processor;
memory;
a program module, wherein the program module is stored in the memory and configured to be executed by the processor, the program module including:
instructions for measuring an output load of a power supply in a computer system using one or more telemetry monitors in the computer system;
instructions for determining if an efficiency of the power supply corresponding to the measured output load is within a predetermined range, wherein determining if the efficiency is within the predetermined range comprises predicting the efficiency based on an operational history of at least a portion of the computer system and pending jobs in a job queue, wherein the predetermined range includes an optimal efficiency of the power supply; and
instructions for performing remedial action if the efficiency is outside of the predetermined range so that the power supply operates at an adjusted efficiency that falls within the predetermined range.

* * * * *